US011321453B2

(12) United States Patent
Kosarev et al.

(10) Patent No.: US 11,321,453 B2
(45) Date of Patent: May 3, 2022

(54) METHOD AND SYSTEM FOR DETECTING AND CLASSIFYING MALWARE BASED ON FAMILIES

(71) Applicant: CHECKPOINT SOFTWARE TECHNOLOGIES LTD., Tel Aviv (IL)

(72) Inventors: Ivan Kosarev, Tel Aviv (IL); Lotem Finkelstein, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 428 days.

(21) Appl. No.: 16/387,642

(22) Filed: Apr. 18, 2019

(65) Prior Publication Data

US 2020/0334353 A1    Oct. 22, 2020

(51) Int. Cl.
*G06F 21/53* (2013.01)
*G06N 7/02* (2006.01)
*G06F 21/56* (2013.01)

(52) U.S. Cl.
CPC .............. *G06F 21/53* (2013.01); *G06F 21/56* (2013.01); *G06N 7/02* (2013.01); *G06F 2221/034* (2013.01)

(58) Field of Classification Search
None
See application file for complete search history.

(56) References Cited

U.S. PATENT DOCUMENTS

| 9,594,906 | B1* | 3/2017 | Langton | G06F 21/566 |
| 10,230,749 | B1* | 3/2019 | Rostami-Hesarsorkh | G06F 21/552 |
| 2013/0145463 | A1* | 6/2013 | Ghosh | G06F 21/56 726/22 |
| 2015/0135262 | A1* | 5/2015 | Porat | G06F 21/554 726/1 |
| 2017/0250997 | A1* | 8/2017 | Rostamabadi | H04L 63/1425 |
| 2021/0117544 | A1* | 4/2021 | Kurtz | G06F 21/567 |

* cited by examiner

*Primary Examiner* — Christopher C Harris
(74) *Attorney, Agent, or Firm* — Mark M. Friedman

(57) ABSTRACT

Methods and systems utilizing sandbox outputs for files, such as dynamic file analysis (DFA) reports, regardless of size, to automatically create rules. From these rules, the maliciousness of the file is determined, and if the file is malicious, i.e., malware, the malware is classified into malware families.

19 Claims, 4 Drawing Sheets

METHOD AND SYSTEM FOR DETECTING AND CLASSIFYING MALWARE BASED ON FAMILIES

TECHNICAL FIELD

The present invention is directed to the rapid and accurate detection and classification of malware.

BACKGROUND

Malware and its variants are classified in numerous ways. A top level, malware classification is typically by the type of the malware—the basic way the malware operates (e.g., stealing information or encrypting files). The next classification level is by family, which refers to the origin of the malware and the structure of the malware.

There are several ways to perform malware family classification. The two leading methods are based on static analysis or dynamic analysis. Static analysis studies the original code of the malware, and dynamic analysis uses the malware behavior after execution to distinguish one family from another.

For several years, sandboxing has been used to detect malicious files based on their behavior in simulated environments. One of the challenges in file dynamic analysis is coupling detection with malware family classification. While detecting malicious behavior is an established and relatively simple technique, identifying the malware family based on dynamic behavior is considered more complex, and the combination even more so. This is due to the demands of identifying the maliciousness of the software as well as its family in real time.

Most of the solutions rely heavily on manual malware analysis and developing specific malware-defining rules. The rules are designed to detect predefined artifacts and behaviors in the sandbox output and trigger detection. The rules are limited, such that analyzing the suspected malware with respect to the rules is not a long decision making process, thereby making it more suitable to production environments. However, these processes remain slow, time and computer resource consuming, and are not always as accurate as expected.

SUMMARY

The methods and systems of the present invention utilize sandbox outputs, regardless of size, to automatically create rules to predict the degree of maliciousness, and to classify the malware into malware families. In some cases, the invention achieves these goals in less than one second.

The methods and systems of the present invention represent, typically the sandbox emulation report from full sandbox output, with fuzzy hashes, and measures the distance of the detected malware from previously seen malware families. To fine-tune the result, the system also extracts indicators of compromise (IoC) and artifacts from the report and compares them with possible candidates that were raised during the distance phase. The system then attempts to identify the most similar known family, based on the fuzzy hash distance, shared artifacts and IoC. If there is a match, the presently detected malware is classified as a member of a known family. If not, the system stores the fuzzy hashes, artifacts and IoC, and establishes a new malware family for the malware which has just been detected.

These methods are typically performed in real time, and take only about one second. This is a substantial improvement over conventional malware classification systems and methods, which typically take minutes, or must be performed off-line, due to large numbers of time consuming and computer resource consuming processing steps.

Additionally, the distance phase from the fuzzy hash matches eliminates most malware families, such that the number of comparisons for artifacts in the IoC phase is significantly reduced, as only files of candidate malware families are presented for the IoC phase, rather than files for all malware families. Accordingly, the number of files in the IoC matching is in the hundreds, rather than in the thousands, had all malware family files been used in the IoC comparison.

The system also ranks the malware execution quality and factors this into the final decision. The system ignores poor execution quality, such as when the malware evades the emulation environment or fails to be executed. In these cases, the system automatically concludes that malware has been detected and files are blocked from reaching their intended destination.

Embodiments of the invention are directed to a method of using a particular computer to classify malware. The method comprises: using the particular computer to represent a report of a sandbox emulation of a file with one or more first fuzzy hashes; using the particular computer to compare the one or more first fuzzy hashes of the represented report with second fuzzy hashes of one or more files of known malware, to determine malware candidate files; and, using the particular computer to analyze each said malware candidate file for artifact matches with artifacts extracted from the representation of the sandbox emulation report.

Optionally, the method is such that using the particular computer to compare the one or more first fuzzy hashes of the representation of the sandbox emulation report with the second fuzzy hashes of one or more files of known malware includes: using the particular computer to compare the first fuzzy hashes to the second fuzzy hashes in a distance analysis of points on the first and second fuzzy hashes.

Optionally, the method is such that the particular computer, prior to determining the malware candidate files determines whether the file is malicious or benign from the representation of the sandbox emulation report.

Optionally, the method is such that the particular computer, having determined that the file is malicious analyzes the comparison of the one or more first fuzzy hashes of the representation of the sandbox emulation report with second fuzzy hashes of one or more files of known malware, to determine zero or more candidate files.

Optionally, the method is such that the particular computer determines a predetermined amount of points are within a predetermined distance of each other, the file corresponding to the second fuzzy hash is a malware candidate file.

Optionally, the method is such that the predetermined amount of points being within a predetermined distance is approximately 70 percent.

Optionally, the method is such that when there are zero candidate files, the particular computer classifies the file as unknown malware.

Optionally, the method is such that when there are one or more candidate files, the particular computer analyzes each said malware candidate file for artifact matches with artifacts extracted from the representation of the sandbox emulation report, such that the artifact matches include the artifacts in the candidate malware files matching at least 10 percent of the artifacts extracted from the representation of the sandbox emulation report.

Optionally, the method is such that when artifact matches are less than approximately 10 percent, the particular computer classifies the malware as new and unknown.

Optionally, the method is such that when artifact matches are greater than approximately 10 percent, the particular computer classifies the malware as known.

Optionally, the method is such that the particular computer selects the best fit candidate file from the candidate files with artifact matches greater than approximately 10 percent, Optionally, the method is such that the particular computer assigns the best fit candidate file to a known malware family.

Optionally, the method additionally comprises: extracting artifacts from the representation of the sandbox emulation report, such that the extracted artifacts are used for artifact matching with artifacts in each of the one or more malware candidate files.

Optionally, the method is such that the sandbox emulation report is approximately 100 Megabytes.

Optionally, the method is such that the representation of the sandbox emulation report is less than the sandbox emulation report.

Optionally, the method is such that the representation of the sandbox emulation report is 250 Kilobytes.

Embodiments of the invention are directed to a computer system for classifying malware. The computer system comprises: a non-transitory storage medium for storing computer components; and, a computerized processor for executing the computer components. The computer components comprise: a module for representing a report of a sandbox emulation of a file with one or more first fuzzy hashes; a module for comparing the one or more first fuzzy hashes of the represented report with second fuzzy hashes of one or more files of known malware, to determine malware candidate files; and, a module for analyzing each said malware candidate file for artifact matches with artifacts extracted from the representation of the sandbox emulation report.

Optionally, the computer system additionally comprises: a module for determining whether the file is malicious or benign from the representation of the sandbox emulation report.

Embodiments of the invention are directed to a computer usable non-transitory storage medium having a computer program embodied thereon for causing a suitably programmed system to classify malware, by performing the following steps when such program is executed on the system. The steps comprise: representing a report of a sandbox emulation of a file with one or more first fuzzy hashes; comparing the one or more first fuzzy hashes of the represented report with second fuzzy hashes of one or more files of known malware, to determine malware candidate files; and, analyzing each said malware candidate file for artifact matches with artifacts extracted from the representation of the sandbox emulation report.

Optionally, the computer usable non-transitory storage medium is such that the steps additionally comprise: prior to determining the malware candidate files, determining whether the file is malicious or benign from the representation of the sandbox emulation report.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

URL (Uniform Resource Locator) is a reference to a resource that specifies the location of the resource on a computer network and a mechanism for retrieving it, such as an address of a specific Web site or file on the Internet.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
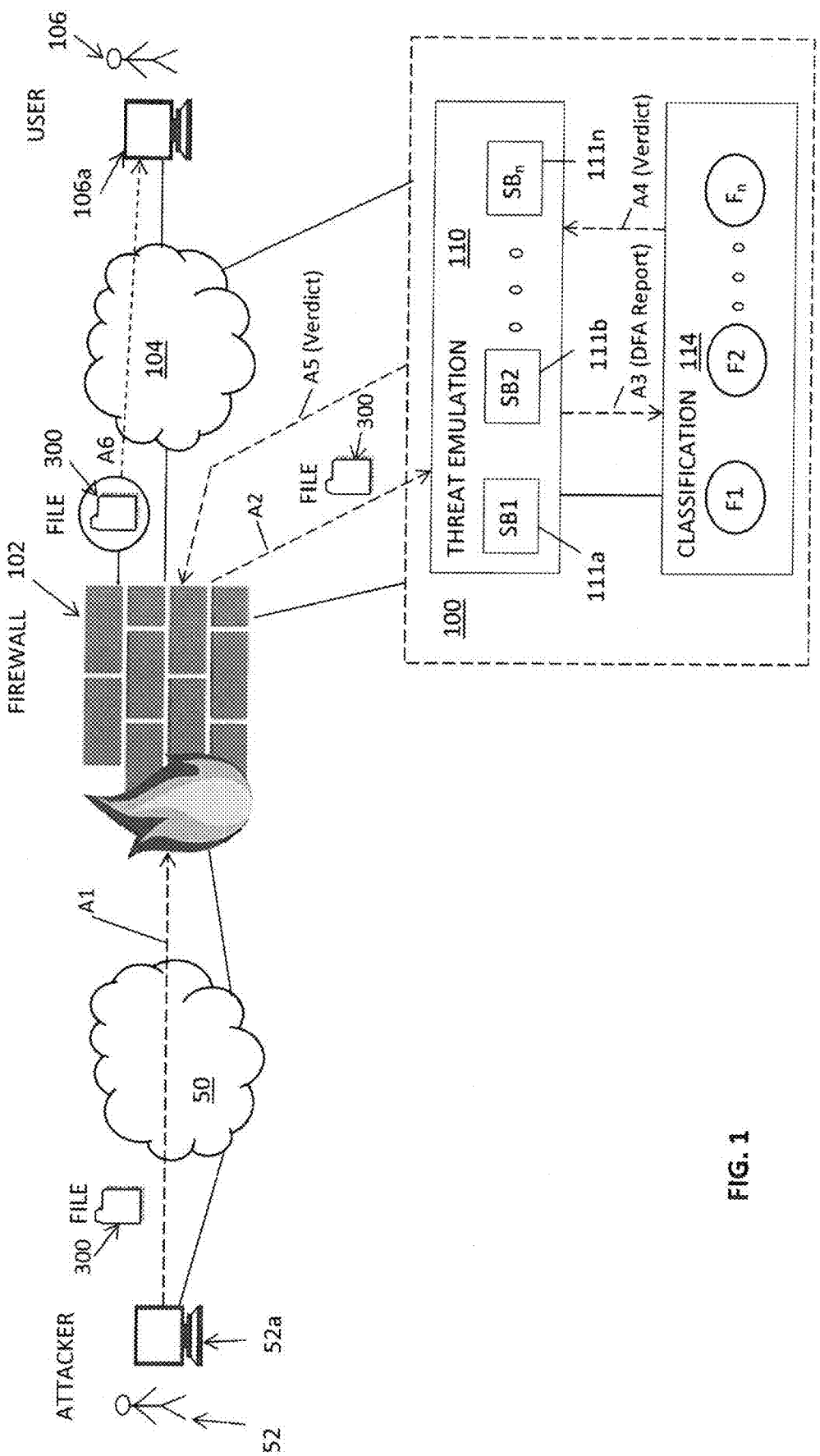
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Additionally, a "module" includes a component for storing instructions (e.g., machine readable instructions) for performing a process, and including or associated with processors for executing the instructions. Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention provides methods and systems utilizing sandbox outputs for files, such as dynamic file analysis (DFA) reports, regardless of size, to automatically create rules. From these rules, the maliciousness of the file is determined, and if the file is malicious, i.e., malware, the malware is classified into malware families.

FIG. 1 shows an example environment in which the invention operates. For example, a system 100 (shown by a broken line box) links to a network inspection device 102, commonly known as a "firewall" (the terms 'inspection device" and "firewall" used interchangeably herein). The network inspection device 102 is, for example, a network security system, either hardware-based and/or software-based, that controls incoming and outgoing network traffic based on a set of rules. The firewall 102 serves as a gateway between an external network 50, such as the internet and/or cellular networks and the like, and an internal network 104, for example, an enterprise network, to which user computers 106a or users 106, are linked.

The external network 50, although shown as a single network, may be a combination of networks and/or multiple networks including, for example, cellular networks. "Linked" as used herein, includes both wired or wireless links, either direct or indirect, such that the computers, including, servers, components and the like, are in electronic and/or data communications with each other.

The system 100 includes multiple machines, computers, servers and the like. A first series of machines forms a Threat Emulation System 110, and includes one or more machines which function as sandboxes (SB1 to SBn, where "n" indicates the last member of a series) 111a-111n. The sandboxes 111a-111n function to run potential malware and other potentially malicious software, files, code and the like, in a safe protected environment, to determine whether it is actually malware.

Figure 2:
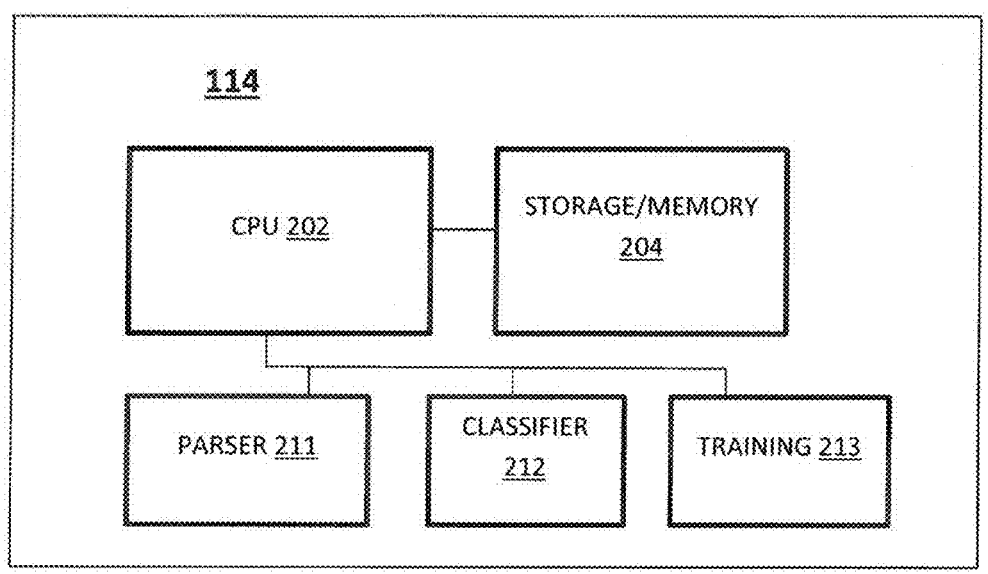
FIG. 2 is a diagram of an example architecture of the classification server of FIG. 1; and, FIGS. 3A and 3B are a flow diagram of a process in accordance with embodiments of the invention.

The Threat Emulation System 110 links to a Classification System 114, formed for example, of one or more classification servers, with an example classification server, forming the classification system 114, shown in detail on FIG. 2. The classification server(s) of the classification system 114 serve to classify the malware detected by the Threat Emulation System 110 into families F1, F2, Fn, for example, automatically and in real time.

For describing example operations of the invention below, an attacker 52, via his computer 52a, links to the network 50.

The attacker sends a malicious file whose intended recipient is the user 106, on his computer 106a.

Turning also to FIG. 2, there is shown the architecture of an example classification server of the classification system 114. Although shown on a single server, the components of the classification system 114 may be arranged in one or more classification servers. The classification system 114 includes processors (e.g., a Central Processing Unit (CPU) 202), linked to storage/memory 204. There are also modules including a parser 211, a classifier 212 and a training module 213, which operate in conjunction with the CPU 202 and storage/memory 204 to perform the processes (methods) of the present invention. For example, the processors may include x86 Processors from AMD and Intel, Xenon® and Pentium® processors from Intel, as well as any combinations thereof. Additional processors, including hardware processors, storage/memory, modules and storage media may also be part of the system for performing the invention.

The storage/memory 204 stores machine-executable instructions executed by the CPU 202 for performing the processes of the invention, for example, those detailed in FIG. 3, which when programmed accordingly into the CPU 202, control the classification system 114. There may also be additional servers associated with the classification system 114. The storage/memory 204, for example, also provides temporary storage for the classification system 114.

The parser (parsing module) 211 is such that it obtains a dynamic file analysis (DFA) report (also known as a "DFA Report", a "sandbox emulation report" or "report"), for example, a full sandbox report and parses it by: 1) parsing the report into a fuzzy hash (fuzzy hashes are point graphs, and are coordinated for comparing two distinctly different items and determine a fundamental level of similarity (expressed as a percentage) between the two, for example, as described in Kornblum, "*Identifying Almost Identical Files Using Context Triggered Piecewise Hashing*," in, Digital Investigation 3S, S91-S97 (2006), this document incorporated by reference herein, by using, for example, MinHash (min-wise independent permutations locality sensitive hashing scheme), an open source software which estimates the similarity of sets, as described, for example in "Locally Sensitive Hashing—An Effective Way of Reducing the Dimensionality of Your Data", attached hereto as Appendix A, and "Locally Sensitive Hashing—LSH Explained", attached hereto as Appendix B; and, 2) parsing the report based on an Indicator of Compromise (IoC) features, to extract IoC and artifacts from the sandbox report.

The classifier 212 functions to determine the malware family the detected malware is associated with or determine that the detected malware is part of a new family.

The training module 213 is used to train the classification database (of block 312) as to whether a file and/or computer process associated with the file, is malicious or benign.

Figure 3A:
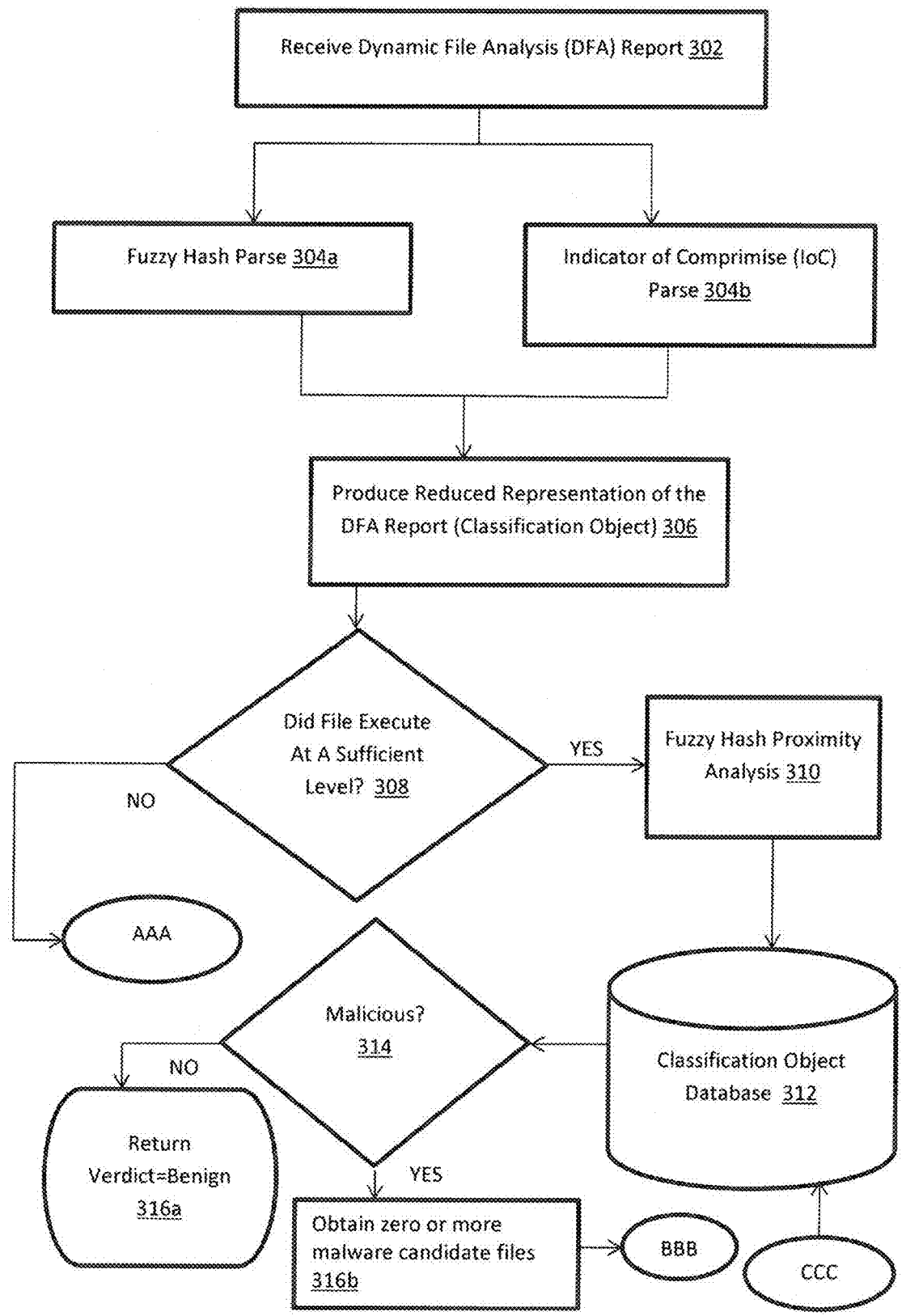
Figure 3B:
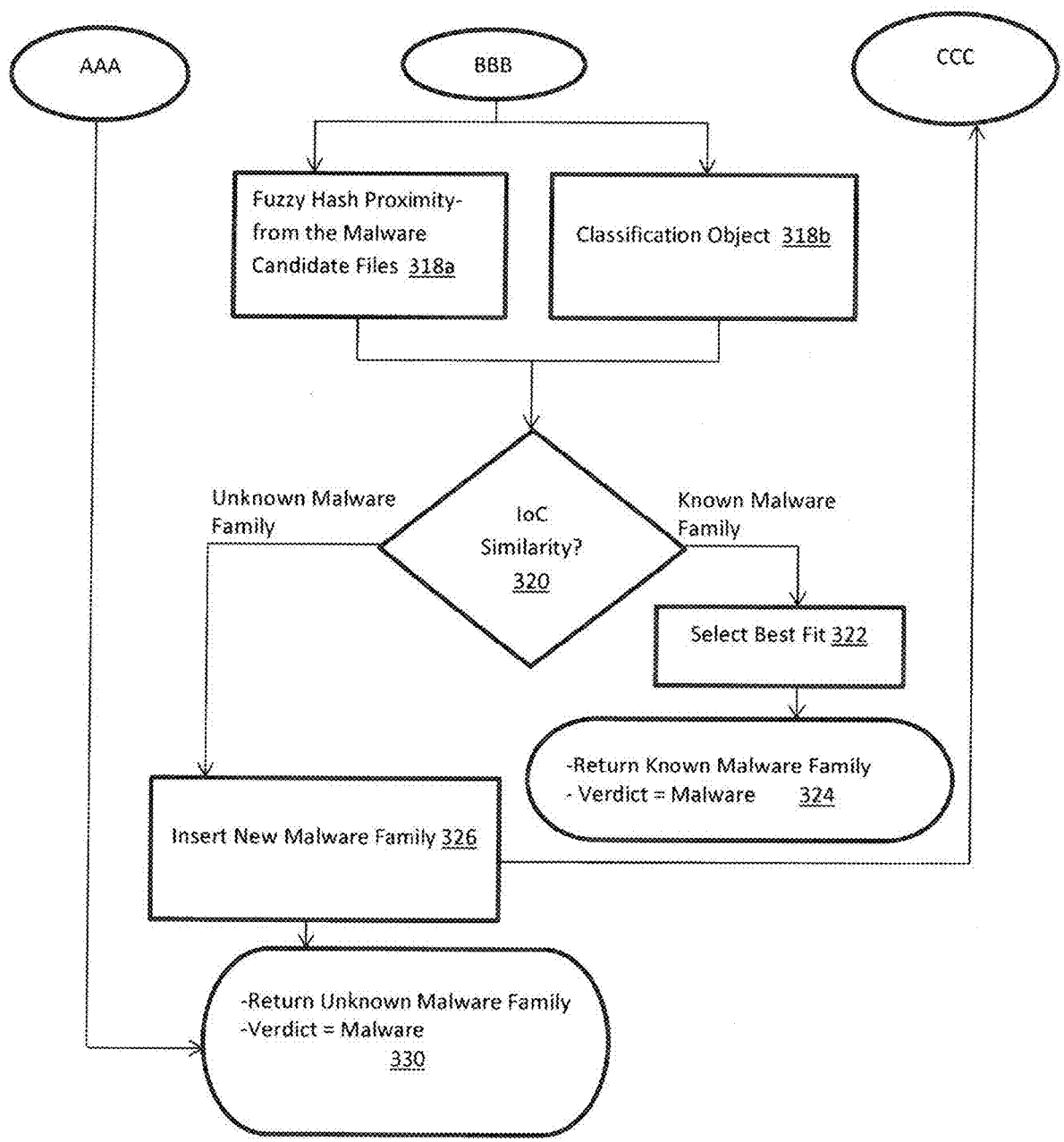

Attention is now directed to FIGS. 3A and 3B, which show a flow diagram detailing a computer-implemented process and sub-processes in accordance with embodiments of the disclosed subject matter. Reference is also made to elements shown in FIGS. 1 and 2. The aforementioned processes and sub-processes are, for example, performed dynamically and in real time, such that a result, a determination whether the file 300 is malicious, e.g., malware, or benign, and if malicious, is the malware from a known or unknown family. The determinations are obtained quickly, for example, on the order of seconds, for example, in approximately one second.

Initially, from FIG. 1, the attacker 52, via his computer 52a, sends a malicious file 300 to the user 106 at the user computer 106a, the intended recipient. The file 300 reaches the firewall 102, (shown by broken line arrow A1), where it is intercepted. The firewall passes the file 300 to the Threat Emulation System 110 (shown by broken line arrow A2), where the file 300 executes in one of the sandboxes SB1-SBn 111a-111n.

At block 302, a dynamic file analysis (DFA) report has been received by the classification system 114 (shown by broken line arrow A3). The DFA report is, for example, a data file of approximately 100 megabytes which documents forensics of all events which occurred in the sandbox (SB) 111a-111n, while the file 300 executed and was emulated in the sandbox. The DFA report documents all of the events that occurred in the respective sandbox (SB) 111a-111n at the time the file 300 automatically executed, and all computer processes associated with each of the events. As used herein a "computer process" (commonly known as a "process" but called a "computer process" in this document to avoid confusion with the "processes" of blocks 302 to 330 of the flow diagram of FIGS. 3A and 3B) is a running program with which a particular set of data is associated, so that the process can documented. The DFA report is a forensic report, from which malware characteristics are determined, and in many cases also includes a determination of whether the suspected file is malware.

The process moves to blocks 304a and 304b, which are contemporaneously, and in some cases, simultaneously performed processes. At block 304a, the DFA report is parsed. The parsing employs, for example, a Fuzzy Hash parser of the parser 211, based on MinHash, that separates each computer process of the DFA report into 256 fuzzy hashes. At block 304b, an Indicator of Compromise (IoC) parser parses the DFA report by taking all artifacts documented on the DFA report and lists them with reference to the computer process that created each of the artifacts. The artifacts include, for example, URLs, domains contacted during the emulation, mutexes, file names and their content, computer processes (processes) Identifications (IDs), domain Uniform Resource Locators (URLs), registry keys and their values, and the like.

From blocks 304a and 304b, the process moves to block 306, where a reduced representation (representation) of the DFA report is made, by combining the parsed data from the Fuzzy Hash and IoC parsers 211. This reduced representation of the DFA report is known as a Classification Object, and is, for example, approximately 250 kb. The classification object is a representation of the dynamic file analysis (DFA) report, and includes, for example, IoCs and the fuzzy hashes.

The process then moves to block 308, where the system 100 determines whether the file 300 has executed sufficiently. For example, the execution quality is used to determine whether the process will continue to block 310. The system 100 ignores poor execution quality, such that the malware (when the file 300 is malicious) has either evaded the sandboxes (SB) 111a-111n of the emulation system 110 environment file, or has failed to execute in the sandboxes (SB) 111a-111n. For example, a sufficient execution of a file is such that a report can be generated with enough usable data to detect whether the computer processes of the file, which executed in the sandbox (SB) 111a-111n, can be determined to be malicious or benign (not malicious). If no at block 308, the execution was insufficient, and the process moves to block 330, where an unknown malware family is returned for this insufficiently executed computer process.

If yes, at block 308, the process moves to block 310, where, for example, all of the 256 fuzzy hashes for each computer process are evaluated to find close candidates. A close candidate, for example, is defined by a predetermined threshold, for example, up to 30% difference or error, between corresponding points of the fuzzy hash and a stored file (malicious or non-malicious) being within a predetermined distance of each other, as determined, for example, by a MinHash algorithm.

From block 310, the process moves to block 312, where a classification object database is evaluated to determine a list of candidates, e.g., malware families, for example, as malware candidate files, which meet the predetermined threshold, e.g., 30% error. By comparing against a fuzzy hash of the malware families in the classification database, based on evaluation of fuzzy hash distances, it can be determined: 1) whether candidates are close enough (within the fuzzy hash error threshold, e.g., 30%), 2) there are not any close candidates (outside the error threshold, greater than 30% error), or, 3) the file is benign.

Turning to the processes of blocks 312, 314, 316a and 316b, these processes are performed to detect whether the file 300 includes threats, such as malware. The processes performed by the aforementioned blocks are a fuzzy hash matching phase.

From block 312, the process moves to block 314, where based on the learning from the threat emulation system 110, the classification database has been trained to know (and detect) a malicious computer process or a benign computer process. A decision is made for each computer process, at block 314.

At block 314, if no malicious computer processes are detected, based on the trained classification database, the process moves to block 316a, where the computer processes are benign (non-malicious). As is the case for block 316a, since the computer process of the file are benign, a "benign" verdict is issued. This "benign" verdict moves from the classification system 114 back through the threat emulation system 110, via broken line arrow A4, and to the firewall 102, via broken line arrow A5. The firewall 102 releases the file 300 and sends the file 300 to the user computer 106a, as per broken line arrow A6. The user computer 106a receives the file 300, as it has not been blocked (by the firewall 102).

If malicious computer processes are found from the emulated file, at block 314, the file 300 is determined as malicious, at block 314. The process moves to blocks 316b, 318a, 318b, 320, 322, 324 and 326, where processes are performed for determining the type of family of the detected malware, in an artifact comparison phase.

Beginning at block 316b, the malicious computer processes are analyzed, as zero or more malware candidate files (or malware candidate family files) are obtained, for the malicious computer processes. Should malware candidate files actually be obtained, these obtained malware candidate files are returned as those which are considered to be the closest or best malware candidate files, for example, based on the application of the MinHash algorithm. These returned malware candidate files are sent for processing at blocks 318a, 318b, and 320.

At block 318a, fuzzy hash proximity—from the malware candidate files is obtained for IoC analysis (at block 320). Similarly, the classification object from block 306, which includes the artifacts provided for comparison, is obtained at block 318 (for IoC analysis at block 320). For example, the processes of blocks 318a and 318b are performed contemporaneously, and, typically, simultaneously.

At block 320, artifacts are compared for IoC similarity in, for example, an IoC analysis. The comparison is made such that each malware candidate family file is compared against the classification object, on a one by one basis, as an IoC comparison. At block 320, it is determined which artifacts are shared between each of the malware candidate files and the classification object, to determine whether malware families from the malware candidate files are known or unknown malware families.

In the case where zero malware candidate files are returned, at block 316b, the process moves to blocks 318a and 318b, for example, contemporaneously, and onto block 320. At these blocks, no action is taken. As a result of no action being taken, the process moves from block 320 to block 326. From block 326, the process moves to both of blocks 312 and blocks 330, contemporaneously and, for example, simultaneously.

From block 326 to block 312, the file for the new or unknown malware family and its classification object is inserted into the classification database, at block 312. From block 326 to block 330, the system 114 classifies the malware family as unknown or new. Also, at block 330, a verdict is issued that the file 300 is malware. A verdict of "malware" for the file 300 is returned from the classification system 114, via the broken line arrow A4 to the threat emulation system 110, and, in turn, is transmitted to the firewall 102, via the broken line arrow A5. The file 300 is blocked by the firewall 102 from reaching the user computer 106a.

Returning to block 316b, when one or more malware candidate files are returned or otherwise obtained, the process moves to blocks 318a and 318b, and then to block 320, where the artifacts are compared. The comparison is made such that each malware candidate family file is compared against the classification object, on a one by one basis, as an IoC comparison.

At block 320, it is determined which artifacts are shared between each of the malware candidate files and the classification object, to determine whether malware candidate families are known or unknown malware families.

At block 320, should there be sufficient artifact sharing meeting an artifact threshold, which is predetermined, for example, at least 10% of the artifacts are common to both the malware candidate family file and the classification object, the malware candidate family of the malware candidate family file is considered to be a known malware family, and the process moves to block 322. At block 322, the malware candidate family file which is the best fit, based on artifact comparison, is selected, and is returned as a known malware family, at block 324. A verdict of "malware" for the file 300 is returned from the classification system, via the broken line arrow A4, to the threat emulation system 110, and, in turn, transmitted to the firewall 102, via broken line arrow A5. The file 300 is blocked by the firewall 102 from reaching the user computer 106a.

At block 320, should there be insufficient artifact sharing, less than the predetermined artifact threshold, for example, 10%, that the malware family of the candidate is considered to be an unknown or new malware family. The process moves to block 326. From block 326, the process moves to both of blocks 312 and blocks 330, contemporaneously and, for example, simultaneously.

From block 326 to block 312, the file for the new or unknown malware family and its classification object is inserted into the classification database, at block 312. From block 326 to block 330, the system 114 classifies the malware family as unknown or new. Also, at block 330, a verdict is issued that the file 300 is malware. A verdict of "malware" for the file 300 is returned from the classification system 114, via the broken line arrow A4 to the threat emulation system 110, and, in turn, is transmitted to the firewall 102, via the broken line arrow A5. The file 300 is blocked by the firewall 102 from reaching the user computer 106a.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for classifying malware, comprising:
   obtaining a report of a sandbox emulation of a file, the report including computer processes executed during the sandbox emulation and artifacts created by the computer processes, the report having a first file size;
   generating first parsed data by parsing the with a fuzzy hash parser to separate each computer process in the report into one or more fuzzy hashes, the first parsed data including the one or more fuzzy hashes;
   generating second parsed data by parsing the report with an indicator of compromise parser to produce a list that includes all of the artifacts in the report and an association of each of said artifact with the computer process that created said artifact, the second parsed data including the list;
   combining the first parsed data and the second parsed data to produce a classification object that is a representation of the report and that includes the one or more fuzzy hashes and the list, the classification object having a second file size that is less than the first file size;
   comparing the one or more fuzzy hashes of the classification object with second fuzzy hashes of one or more files of known malware, to determine malware candidate files; and
   analyzing each said malware candidate file for artifact matches with artifacts extracted from the list in the classification object.

2. The method of claim 1, wherein the comparing the one or more first fuzzy hashes of the classification object with the second fuzzy hashes of one or more files of known malware includes: comparing the first fuzzy hashes to the second fuzzy hashes in a distance analysis of points on the first and second fuzzy hashes.

3. The method of claim 2, wherein prior to determining the malware candidate files, the method includes determining from the classification object whether the file is malicious or benign.

4. The method of claim 3, wherein having determined that the file is malicious, the method includes analyzing the comparison of the one or more first fuzzy hashes of the classification object with second fuzzy hashes of one or more files of known malware, to determine zero or more candidate files.

5. The method of claim 4, wherein when a predetermined amount of points are within a predetermined distance of each other, the file corresponding to the second fuzzy hash is a malware candidate file.

6. The method of claim 5, wherein the predetermined amount of points being within a predetermined distance is approximately 70 percent.

7. The method of claim 4, wherein when there are zero candidate files, the file is classified as unknown malware.

8. The method of claim 4, wherein when there are one or more candidate files, the method includes analyzing each said malware candidate file for artifact matches with artifacts extracted from the list in the classification object, such that the artifact matches include the artifacts in the candidate malware files matching at least 10 percent of the artifacts extracted from the list in the classification object.

9. The method of claim 8, wherein when artifact matches are less than 10 percent, the malware is classified as new and unknown.

10. The method of claim 8, wherein when artifact matches are greater than 10 percent, the malware is classified as known.

11. The method of claim 10, additionally comprising selecting the best fit candidate file from the candidate files with artifact matches greater than 10 percent.

12. The method of claim 11, additionally comprising assigning the best fit candidate file to a known malware family.

13. The method of claim 8, additionally comprising: extracting artifacts from the classification object, such that the extracted artifacts are used for artifact matching with artifacts in each of the one or more malware candidate files.

14. The method of claim 1, further comprising:
receiving the file at a network inspection device deployed between a user computer and a network prior to the user computer receiving the file; and
emulating the file received at the network inspection device in a sandbox associated with the network inspection device to generate the report.

15. The method of claim 1, wherein the second file size is at least one order of magnitude less than the first file size.

16. A computer system for classifying malware, comprising:
a non-transitory storage medium for storing computer components; and,
a computerized processor for executing the computer components comprising:
a module for obtaining a report of a sandbox emulation of a file, the report including computer processes executed during the sandbox emulation and artifacts created by the computer processes, the report having a first file size;
a fuzzy hash parser module for generating first parsed data by parsing the report to separate each computer process in the report into one or more first fuzzy hashes, the first parsed data including the one or more fuzzy hashes;
an indicator of compromise parser module for generating second parsed data by parsing the report to produce a list that includes all of the artifacts in the report and an association of each of said artifact with the computer process that created said artifact, the second parsed data including the list;
a combiner module for combining the first parsed data and the second parsed data to produce a classification object that is a representation of the report and that includes the one or more fuzzy hashes and the list, the classification object having a second file size that is less than the first file size;
a comparison module for comparing the one or more first fuzzy hashes of the classification object with second fuzzy hashes of one or more files of known malware, to determine malware candidate files; and,
an analysis module for analyzing each said malware candidate file for artifact matches with artifacts extracted from the classification object.

17. The computer system of claim 16, additionally comprising:
a module for determining whether the file is malicious or benign from the classification object.

18. A computer usable non-transitory storage medium having a computer program embodied thereon for causing a suitably programmed system to classify malware, by performing the following steps when such program is executed on the system, the steps comprising:
obtaining a report of a sandbox emulation of a file, the report including computer processes executed during the sandbox emulation and artifacts created by the computer processes, the report having a first file size;
generating first parsed data by parsing the report with a fuzzy hash parser to separate each computer process in the report into one or more fuzzy hashes, the first parsed data including the one or more fuzzy hashes;
generating second parsed data by parsing the report with an indicator of compromise parser to produce a list that includes all of the artifacts in the report and an association of each of said artifact with the computer process that created said artifact, the second parsed data including the list;
combining the first parsed data and the second parsed data to produce a classification object that is a representation of the report and that includes the one or more fuzzy hashes and the list, the classification object having a second file size that is less than the first file size;
comparing the one or more first fuzzy hashes of the classification object with second fuzzy hashes of one or more files of known malware, to determine malware candidate files; and,
analyzing each said malware candidate file for artifact matches with artifacts extracted from the representation of the classification object.

19. The computer usable non-transitory storage medium of claim 18, wherein the steps additionally comprise: prior to determining the malware candidate files, determining whether the file is malicious or benign from the classification object.

* * * * *